Patented Oct. 30, 1928.

1,689,237

UNITED STATES PATENT OFFICE.

VICTOR M. FREY, OF YORK, PENNSYLVANIA.

MANUFACTURE OF FINISHING LIME.

No Drawing.   Application filed February 12, 1925.   Serial No. 8,687.

Finishing lime for use in the plastering arts is required to have certain qualities of smoothness, plasticity relatively slow setting, etc., as compared with harsh lime used for rough plastering. According to the standard set by the American Society for Testing Materials, finishing lime should have a plasticity figure of 200 or more as determined by the platicimeter test.

The presence of magnesium hydroxid in the finishing lime tends to promote its plastic qualities, and finishing limes have been commonly made from dolomite. But according to the processes heretofore in use, it has not been possible to make a good finishing lime from the majority of dolomite deposits which abound in the United States. Only certain exceptionally pure porous dolomites of the Ohio region have been adopted for this purpose. The object of the present invention is to provide a cheap and efficient process whereby any reasonably pure dolomites, such as abound in many points of the United States, may be used for the purpose of making high grade finishing lime and to provide a product of high and more uniform grade than has heretofore been available.

According to my invention, the dolomite is first ground advantageously so that all of it will pass a 50 mesh screen and much of it will pass a 100 mesh screen. Coarse grinding may be used, but corresponding longer heat treatment will in such case be required. Uniform grinding, however, is desirable as it tends to equalize the heat conditions within the different particles during the heat treatment.

The ground dolomite is then passed through a rotary kiln under such conditions of temperature and time of exposure that the material is thoroughly decarbonated without any sintering or hardening of the particles. For this purpose the size and pitch and speed of rotation of the kiln, and the temperature maintained therein and the fineness of the grinding should be suitably and correlatively adjusted until the desired light colored soft unsintered decarbonated product is obtained. Since the reaction brought about in the stone depends not alone upon the kiln temperature, but upon the exposure to the reactive temperature of each molecule of the stone for a sufficient time for the reaction desired to occur, various adjustments are possible which will produce the desired result with sufficient accuracy for practical purposes. The general requirements are that the maximum temperature obtained by the mass of the material or any substantial portion thereof shall be relatively low as compared with those used in burning dolomite for other purposes, so that the formation of compounds or eutectics of lime and magnesia with impurities such as silica iron and alumina and the conversion of the magnesia into hard periclose crystals may be minimized. On the other hand, the heating conditions must be such as substantially to decarbonate the stone and destroy its original crystalline structure without heating beyond the point where the plastic qualities become impaired.

As an example of suitable conditions I have found that with dolomite ground to the fineness above suggested, treatment in a rotary kiln of the usual type, 120 feet long by 6 feet in diameter with a pitch and speed of rotation adjusted to pass the material through the kiln in about 6 to 7 hours with a temperature in the hot zone of about 1600° F., will yield a very satisfactory finishing lime.

The material after coming from the kiln is of course hydrated or slacked in the usual manner for the preparation of finishing lime. Tests of the product have shown it to be a very high grade finishing lime and to have a plasticity figure well above the standard of 200, usually between 220 and 270.

I have further found that the color of burned dolomite depends not only on the impurities present but also on the temeperature at which it has been burned. By regulating the heating conditions, as above suggested, a pure white finishing lime may be obtained even though a small percentage or decolorizing impurities such as iron oxid are present in the raw dolomite. For making a white product it is, of course, desirable to select a raw material that is as free as practicable from impurities which tend to color the finished product. But when using my process it is not necessary to be so careful in selecting dolomite free from iron oxide and other impurities tending to color the product as has heretofore been deemed essential for making finishing lime from dolomite by other processes.

It will be obvious from the foregoing that various modifications may be made in the details of the process above described without departing from the spirit and scope of my invention.

I claim:

1. In a process for the manufacture of finishing lime, grinding dolomite rock, passing the ground dolomite without admixture of plasticity producing material through a rotary kiln, maintained under heating conditions insufficient to sinter or harden the particles, but adequate substantially to decarbonate the mass and hydrating the product thus obtained.

2. In a process for the manufacture of finishing lime passing finely ground dolomite without admixture of plasticity producing material through a rotary kiln of such size, pitch and speed of rotation as to keep the material in the kiln about 6 to 7 hours while maintaining a temperature in the hot zone of the kiln insfficient to sinter or harden the product, but sufficient substantially to decarbonate the mass and hydrating the product thus obtained.

3. In a process for the manufacture of finishing lime passing finely ground dolomite without admixture of plasticity producing material through a rotary kiln while maintaining a temperature around 1600° F. in the hot zone of the kiln, at a rate sufficient substantially to decarbonate the material without sintering or hardening thereof and hydrating the product thus obtained.

4. In a process for the manufacture of finishing lime passing finely ground dolomite without admixture of plasticity producing material through a rotary kiln of such size, pitch and speed of rotation as to keep the material for 6 to 7 hours in the kiln while maintaining a temperature around 1600° F. in the hot zone of the kiln and hydrating the product thus obtained.

5. A process for manufacturing finishing lime which consists in grinding impure dolomite, in decarbonating the ground dolomite without admixture of other solid substances, while agitating the same at a temperature below that necessary to produce sintered or hardened particles, and in hydrating the product thus obtained.

6. A process for manufacturing finishing lime which consists in grinding dolomite containing more than two percent of natural impurities, in decarbonating the ground dolomite without admixture of other solid substances, while agitating the same at a temperature below that necessary to produce sintered or hardened particles, and in hydrating the product thus obtained.

7. A process for manufacturing finishing lime which consists in grinding dolomite of the types occurring in New York and Pennsylvania, in decarbonating the ground dolomite without admixture of other solid substances, while agitating the same at a temperature below that necessary to produce sintered or hardened particles, and in hydrating the product thus obtained.

VICTOR M. FREY.